United States Patent
Araki

(10) Patent No.: US 10,261,436 B2
(45) Date of Patent: *Apr. 16, 2019

(54) IMAGE FORMING APPARATUS AND IMAGE PROCESSING APPARATUS TO CORRECT EXPOSURE AMOUNT TO FORM IMAGE

(71) Applicant: CANON KABUSHIKI KAISHA, Tokyo (JP)

(72) Inventor: Go Araki, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,658

(22) Filed: Apr. 6, 2018

(65) Prior Publication Data

US 2018/0224768 A1     Aug. 9, 2018

Related U.S. Application Data

(63) Continuation of application No. 15/344,331, filed on Nov. 4, 2016, now Pat. No. 9,958,803.

(30) Foreign Application Priority Data

Nov. 9, 2015  (JP) .................................. 2015-219795

(51) Int. Cl.
*H04N 1/00*         (2006.01)
*G03G 15/043*     (2006.01)
*G06K 15/02*       (2006.01)
*G03G 15/00*       (2006.01)

(52) U.S. Cl.
CPC ....... *G03G 15/043* (2013.01); *G06K 15/1867* (2013.01); *H04N 1/00* (2013.01); *G03G 15/556* (2013.01)

(58) Field of Classification Search
CPC ............. G03G 15/043; G03G 15/556; G06K 15/1867; H04N 1/00
See application file for complete search history.

(56) References Cited

FOREIGN PATENT DOCUMENTS

| JP | 2003-345076 A | 12/2003 |
| JP | 2004-299239 A | 10/2004 |
| JP | 2007-272153 A | 10/2007 |
| JP | 2010-046983 A | 3/2010 |
| JP | 2015-138101 A | 7/2015 |

*Primary Examiner* — Christopher Wait
(74) *Attorney, Agent, or Firm* — Canon U.S.A., Inc. IP Division

(57) ABSTRACT

In a case where another first region exists which faces the edge pixel across a second region on a line in a predetermined direction passing through the edge pixel of the first region, the correcting unit selects a correction amount for correcting the exposure amount applied by the exposing unit for the pixel to be corrected from information describing a plurality of correction amounts in accordance with a first number of pixels being a number of pixels on the line within the second region between the first region and the other first region and corrects the exposure amount for the pixel to be corrected in accordance with the selected correction amount.

10 Claims, 17 Drawing Sheets

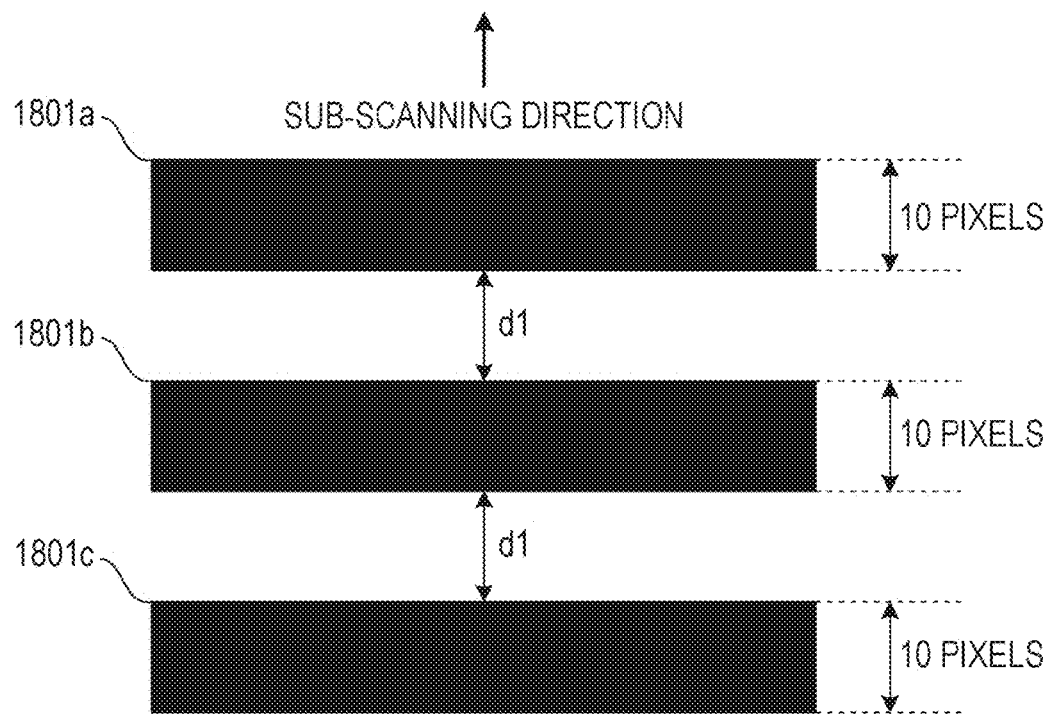
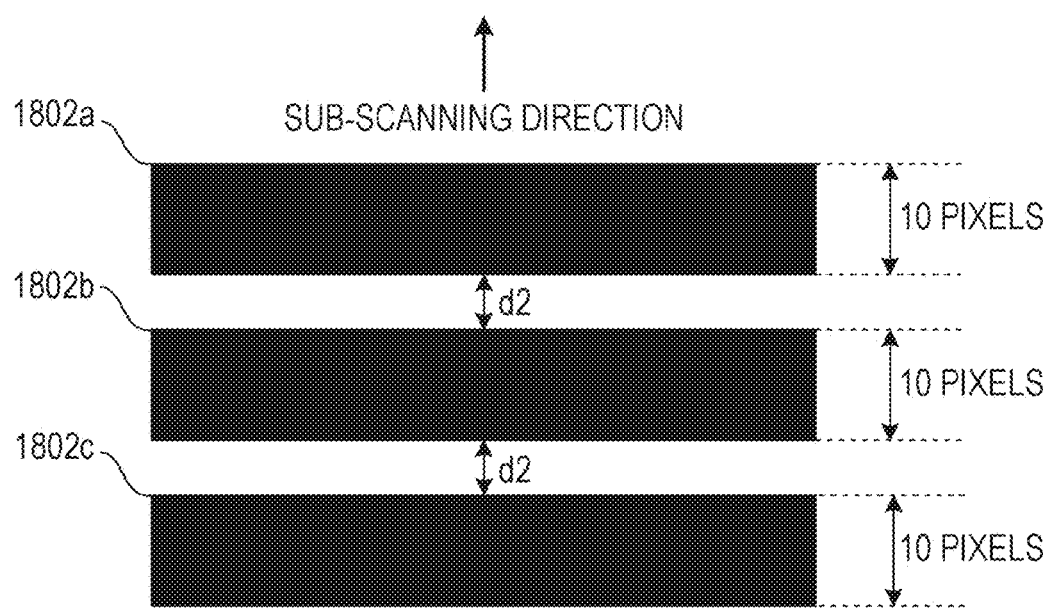

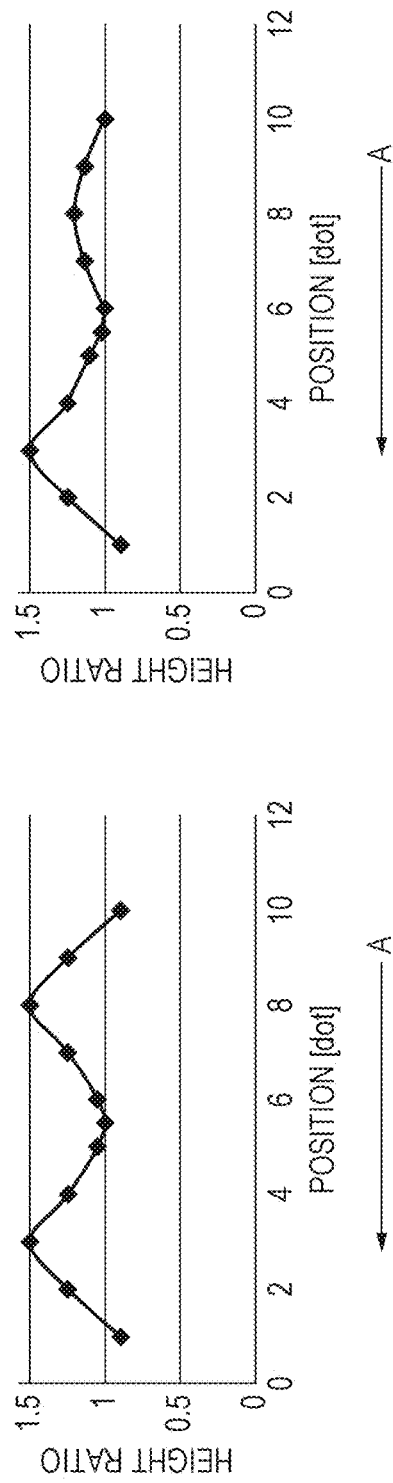
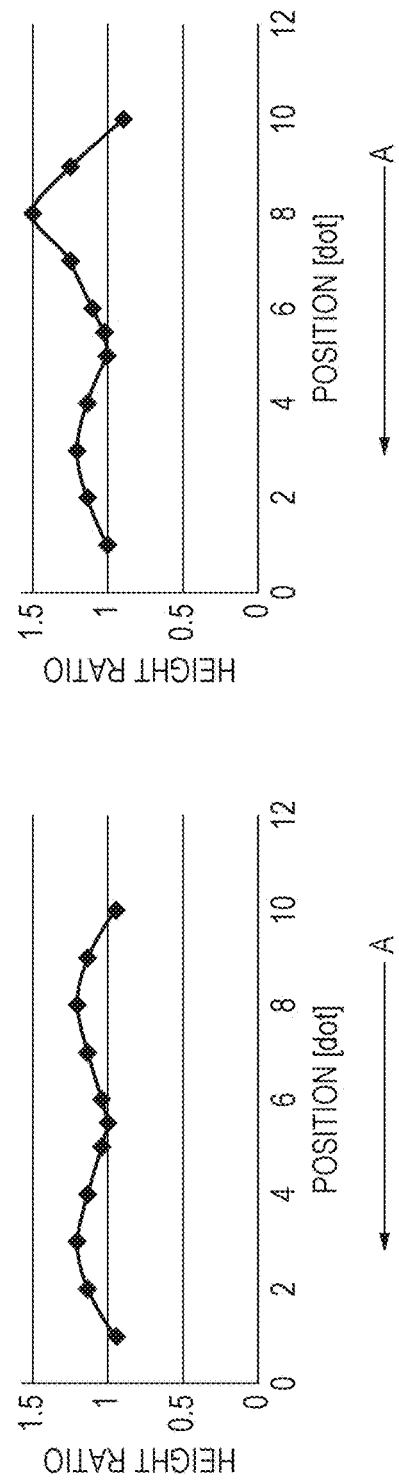

| DISTANCE FROM EDGE | HEIGHT REDUCTION RATIO | REDUCTION RATIO OF EXPOSURE AMOUNT | |
|---|---|---|---|
| | | EXPOSURE INTENSITY | PWM |
| 1 | -0.1 | -0.1 | 0 |
| 2 | 0.25 | 0.25 | 0.25 |
| 3 | 0.5 | 0.5 | 0.5 |
| 4 | 0.25 | 0.25 | 0.25 |
| 5 | 0.05 | 0.05 | 0.05 |

FIG. 13B

| DISTANCE FROM EDGE | HEIGHT REDUCTION RATIO | REDUCTION RATIO OF EXPOSURE AMOUNT | |
|---|---|---|---|
| | | EXPOSURE INTENSITY | PWM |
| 1* | -0.05 | -0.05 | 0 |
| 2* | 0.125 | 0.125 | 0.125 |
| 3* | 0.2 | 0.2 | 0.2 |
| 4* | 0.125 | 0.125 | 0.125 |
| 5* | 0.04 | 0.04 | 0.04 |

IMAGE FORMING APPARATUS AND IMAGE PROCESSING APPARATUS TO CORRECT EXPOSURE AMOUNT TO FORM IMAGE

CROSS-REFERENCE TO RELATED APPLICATION

This application is a Continuation of U.S. application Ser. No. 15/344,331, filed Nov. 4, 2016, which claims priority from Japanese Patent Application No. 2015-219795, filed Nov. 9, 2015, which are hereby incorporated by reference herein in their entireties.

BACKGROUND OF THE INVENTION

Field of the Invention

One disclosed aspect of the embodiments relates to a technology for reducing a consumed amount of a developing agent in an image forming apparatus.

Description of the Related Art

In an image forming apparatus, reduction of a consumed amount of toner being a developing agent has been demanded. Japanese Patent Laid-Open No. 2004-299239 discloses a configuration which reduces the exposure intensity for an image having some area to reduce the consumed amount of toner. In an image forming apparatus, a phenomenon called "sweep-up" may occur which is an increased amount of toner adhered to an edge region on a rear end side in a rotational direction of a photosensitive member of an electrostatic latent image formed on the photosensitive member. Japanese Patent Laid-Open No. 2007-272153 discloses a configuration which suppresses an influence caused by sweep-up. More specifically, a correction region is determined based on a data value of a pixel of interest and data values of pixels positioned on a downstream side by a predetermined amount in a sub scanning direction with respect to the pixel of interest. A pixel positioned on an upstream side by a predetermined amount in the sub scanning direction of the pixel in the correction region is further defined as a correction region and the exposure amount in the pixel in the correction region is adjusted to suppress an influence caused by the sweep-up. Such suppression of the influence of the sweep-up can reduce the consumed amount of toner. Additionally, in an image forming apparatus, a phenomenon called an "edge effect" may occur which is an increased amount of toner adhered to an edge region of an electrostatic latent image formed on a photosensitive member.

Because the strength of such sweep-up and edge effects at an edge may vary in accordance with another image in vicinity of the edge, the image quality may be deteriorated even with the configurations disclosed in Japanese Patent Laid-Open Nos. 2004-299239 and 2007-272153.

One disclosed aspect of the embodiments provides an image forming apparatus and an image processing apparatus, which can reduce the consumed amount of a developing agent while preventing reduction of image quality.

SUMMARY OF THE INVENTION

An aspect of the embodiments provides an image forming apparatus forming an image on basis of image data. The apparatus includes a photosensitive member, an exposing unit configured to expose the photosensitive member to light to form an electrostatic latent image, a developing unit configured to develop the electrostatic latent image on the photosensitive member by using a developing agent to form an image, a discriminating unit configured to, on basis of the image data, discriminate a first region being a region having a series of pixels with a pixel value equal to or higher than a predetermined value and a second region being a region having a series of pixels with a pixel value lower than the predetermined value, an identifying unit configured to identify a pixel to be corrected from the pixels within the first region on basis of identification information describing a relationship between an edge pixel positioned at an edge of the first region and the pixel to be corrected, and a correcting unit configured to correct an exposure amount applied by the exposing unit for the pixel to be corrected from an exposure amount described in the image data, wherein, in a case where another first region exists which faces the edge pixel across a second region on a line in a predetermined direction passing through the edge pixel of the first region, the correcting unit selects a correction amount for correcting the exposure amount applied by the exposing unit for the pixel to be corrected from information describing a plurality of correction amounts in accordance with a first number of pixels being a number of pixels on the line within the second region between the first region and the other first region and corrects the exposure amount for the pixel to be corrected in accordance with the selected correction amount.

Further features of the disclosure will become apparent from the following description of exemplary embodiments with reference to the attached drawings.

BRIEF DESCRIPTION OF THE DRAWINGS

FIGS. 9A and 9B illustrate image s according to an embodiment.

FIGS. 10A to 10D illustrate heights of toner of toner images subject to an edge effect according to an embodiment.

FIGS. 11A to 11E illustrate pixels to be corrected against an edge effect according to an embodiment.

FIGS. 13A and 13B illustrate exposure-amount adjustment parameters according to an embodiment.

DESCRIPTION OF THE EMBODIMENTS

Illustrative embodiments will be described below with reference to drawings. The following embodiments are given for illustration purpose and are not intended to limit details of embodiments. Components that are not necessary for describing embodiments are not illustrated in drawings.

First Embodiment

Figure 1:
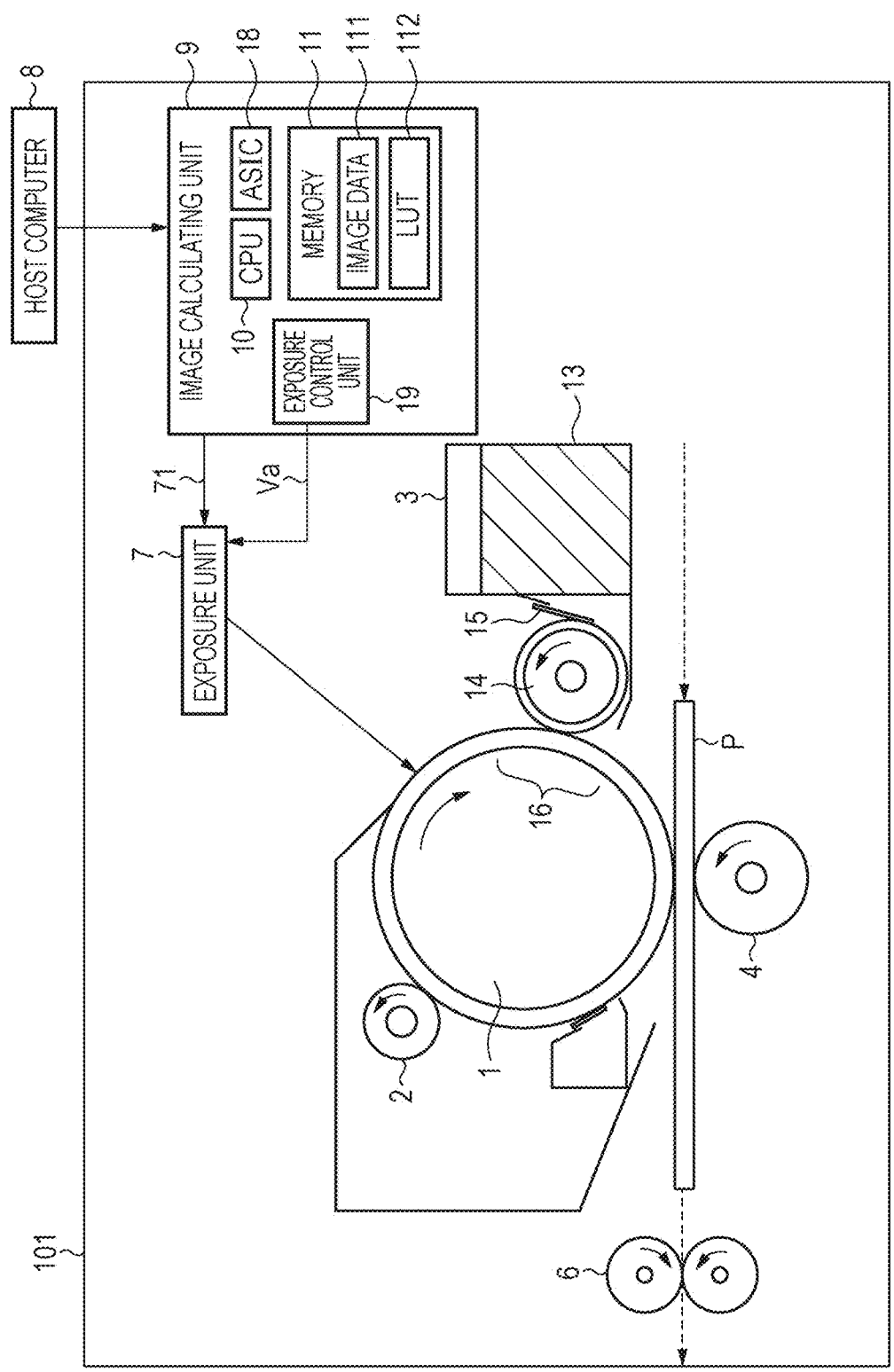
FIG. 1 is a configuration diagram of an image forming apparatus according to an embodiment.

FIG. 1 is a configuration diagram illustrating an image forming apparatus 101 according to this embodiment. A photosensitive member 1 being an image bearing member is driven to rotate in a direction indicated by an illustrated arrow for image formation. A charging unit 2 electrostatically charges a surface of the photosensitive member 1 to an even electric potential. An exposing unit 7 exposes the electrostatically charged surface of the photosensitive member 1 to light based on image data for forming an electrostatic latent image on the photosensitive member 1. The exposing unit 7 is driven in response to a drive signal 71 output from an image calculating unit 9. An exposure control unit 19 in the image calculating unit 9 adjusts such that the exposure intensity achieved by the exposing unit 7 with voltage Va can be equal to a target value.

A developing unit 3 includes a container 13 configured to store toner being a developing agent and a developing roller 14. The toner may be nonmagnetic single-component toner, two-component toner, or magnetic toner. A regulating blade 15 is provided which is configured to regulate the layer thickness of toner supplied to the developing roller 14 to a predetermined value. The regulating blade 15 may be configured to give electric carriers to toner. The toner is conveyed by a developing roller 14 to a development region 16. The development region 16 refers to a region where the developing roller 14 and the photosensitive member 1 are in proximity to or in contact with each other for adhering toner to an electrostatic latent image. The developing unit 3 adheres toner an electrostatic latent image formed on the photosensitive member 1 to visualize it as a toner image. A transfer printing unit 4 performs transfer printing the toner image formed on the photosensitive member 1 formed on a recording material P. A fixing unit 6 applies heat and pressure to the recording material P to fix, to the recording material P, the toner image having undergone transfer printing to the recording material P.

The CPU 10 in the image calculating unit 9 is a control unit configured to generally control over the image forming apparatus 101. According to an embodiment, the overall control, which will be described below, may not be performed by the CPU 10, but a part thereof may be performed by an ASIC 18. Alternatively, the overall control, which will be described below, may be performed by the ASIC 18. A memory 11 is a storage unit configured to store image data and hold an LUT 112. The LUT 112 is a lookup table containing correction width parameters and exposure-amount adjustment parameters. The image calculating unit 9 receives image data transmitted from a host computer 8, suppresses influence of an edge effect and a sweep-up on basis of the correction width parameters and exposure-amount adjustment parameters held in the LUT 112, and corrects the image data to reduce the toner consumed amount.

Figure 2A:
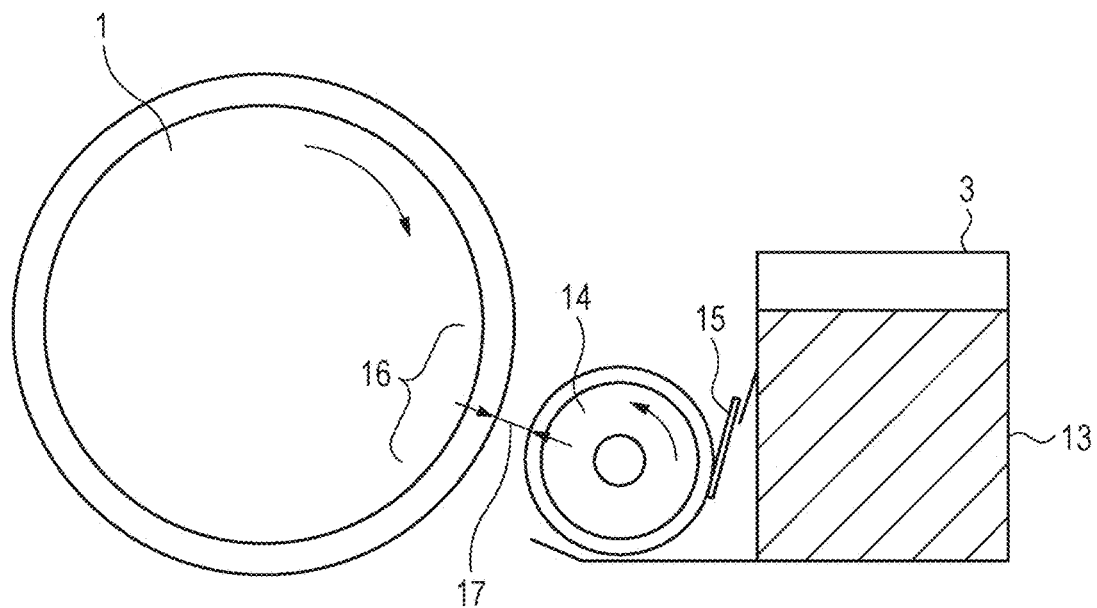
FIGS. 2A and 2B are explanatory diagrams of a developing method according to an embodiment.
Figure 2B:
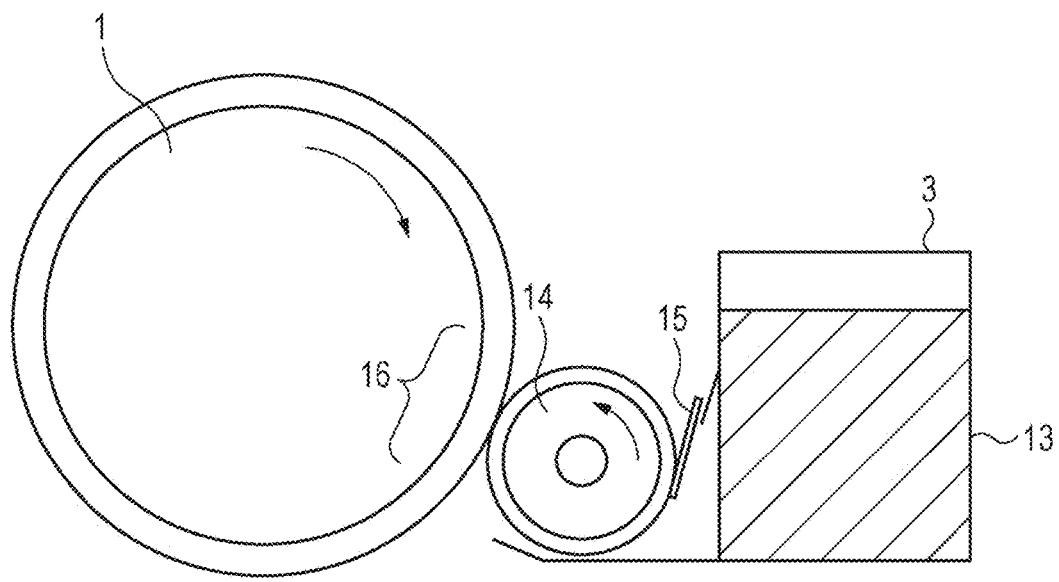

Next, a development system in the developing unit 3 will be described with reference to FIGS. 2A and 2B. FIG. 2A illustrates a configuration of a jumping development system. According to the jumping development system, the developing roller 14 and the photosensitive member 1 are not in contact with each other, but a gap 17 having a predetermined distance is provided therebetween. An AC bias on which a direct current bias is superimposed is used as a developing bias to be output from the developing roller 14. FIG. 2B illustrates a configuration of a contact development system. According to the contact development system, the developing roller 14 and the photosensitive member 1 are in contact with each other. A direct current bias is used as a developing bias to be output from the developing roller 14. In the contact development system, the photosensitive member 1 and the developing roller 14 may be configured to rotate in rotational directions reverse to each other, as illustrated in FIG. 2B, that is, such that their surfaces can move in one direction in the development region 16.

Figure 3:
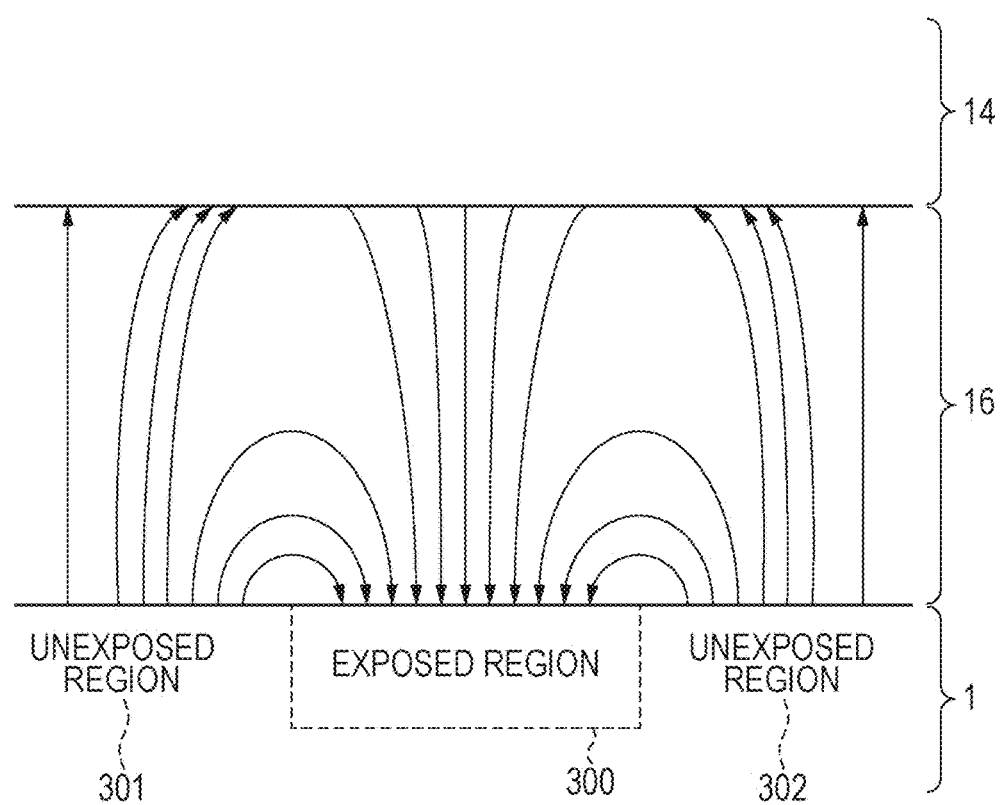
FIG. 3 is an explanatory diagram for a principle of occurrence of an edge effect.

Next, a principle of occurrence of an edge effect and a sweep-up in an edge part where an increased amount of toner is adhered to an electrostatic latent image will be described. The edge effect here refers to a phenomenon that an intensified electric field on an electrostatic latent image formed on the photosensitive member 1, that is, at a boundary between an exposed region and the other unexposed region causes toner to be excessively adhered to an edge of the electrostatic latent image. It is assumed here, for example, that an image to be formed has a uniform density. As illustrated in FIG. 3, electric lines of force from the unexposed regions 301 and 302 surrounding the exposed region 300 go round the edges of the exposed region 300 so that the intensity of the electric fields in the electric fields can be higher than the other part of exposed region 300. Thus, more toner may be adhered to the edges of the exposed region 300 compared to the other part.

Figure 4A:
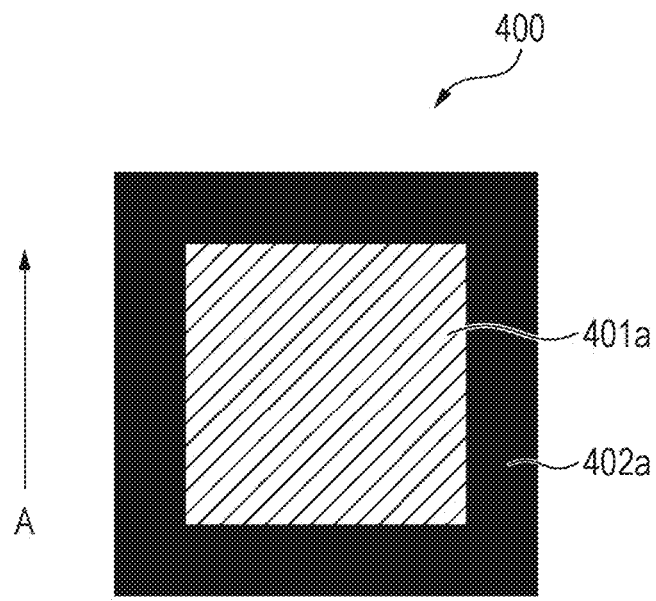
FIGS. 4A and 4B illustrate images having an edge effect and a sweep-up.

FIG. 4A illustrates a toner image 400 having an edge effect. FIG. 4A illustrates an arrow A indicating a conveying direction of a toner image, that is, the rotational direction of the photosensitive member 1. The image data on which the toner image 400 is based have equal pixel values as a whole, that is, the toner image 400 has a uniform density. In a case where an edge effect occurs thereon, toner is intensively adhered to a whole edge region 402a of the toner image 400. As a result, the edge region 402a has a density higher than the density of a non-edge region 401a. Such an edge effect generally occurs when the jumping development system is applied in which a gap is provided between the photosensitive member 1 and the developing roller 14.

Figure 5A:
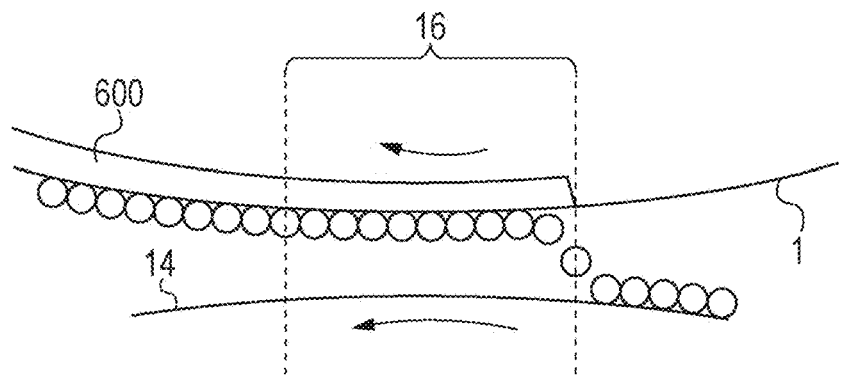
FIGS. 5A to 5C are explanatory diagrams illustrating a principle of occurrence of a sweep-up.
Figure 5B:
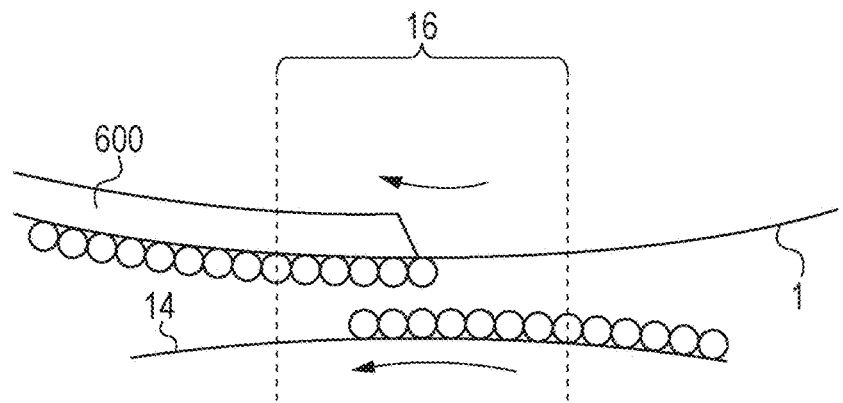
Figure 5C:
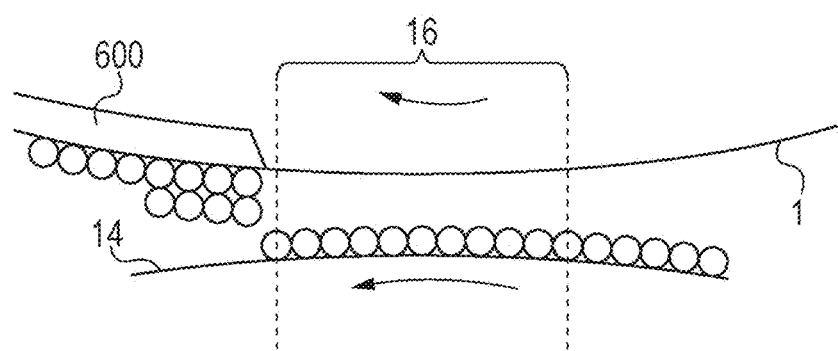

On the other hand, the sweep-up refers to a phenomenon that toner concentrates on an edge region on a rear end side in the rotational direction of the photosensitive member 1 of a toner image. According to the contact development system, the peripheral speed of the developing roller 14 is higher than the peripheral speed of the photosensitive member 1 so that the thickness of the toner on the photosensitive member 1 can be equal to a predetermined value. In the development region 16, as illustrated in FIG. 5A to FIG. 5C, an electrostatic latent image is developed with toner conveyed by the developing roller 14. FIGS. 5A to 5C illustrate circles indicating toner. Because the developing roller 14 rotates at a speed higher than that of the photosensitive member 1, their positional relationship on the surface continuously changes. As illustrated in FIG. 5A, when a rear end of an electrostatic latent image 600 enters to the development region 16, the toner on the developing roller 14 positions more closely to the rear side in the rotational direction with respect to the starting position of the development region 16. However, because the developing roller 14 rotates at a speed higher than the rotating speed of the photosensitive member 1, the toner on the developing roller 14 gets ahead of the rear end of the electrostatic latent image 600 while the rear end of the electrostatic latent image 600 passes through the development region 16 as illustrated in FIG. 5B. Because the toner on the developing roller 14 is supplied to the rear end of the electrostatic latent image 600 as illustrated in FIG. 5C, the amount of toner to be adhered to the rear end of the electrostatic latent image increases. This is a mechanism of occurrence of the sweep-up.

Figure 4B:
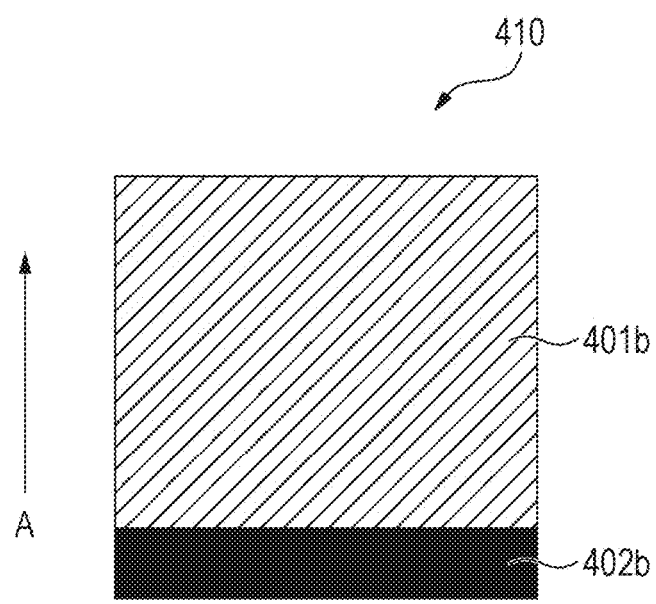

FIG. 4B illustrates a toner image 410 having a sweep-up. FIG. 4B illustrates an arrow A indicating a conveying direction of a toner image, that is, a rotational direction of the photosensitive member 1. The image data on which the toner image 410 is based have equal pixel values as a whole, that is, the toner image 410 has a uniform density. In a case where a sweep-up occurs, toner is intensively adhered to a rear end region 402b of the toner image 410. As a result, the rear end region 402b has a density higher than the density of the other region 401b.

Figure 6:
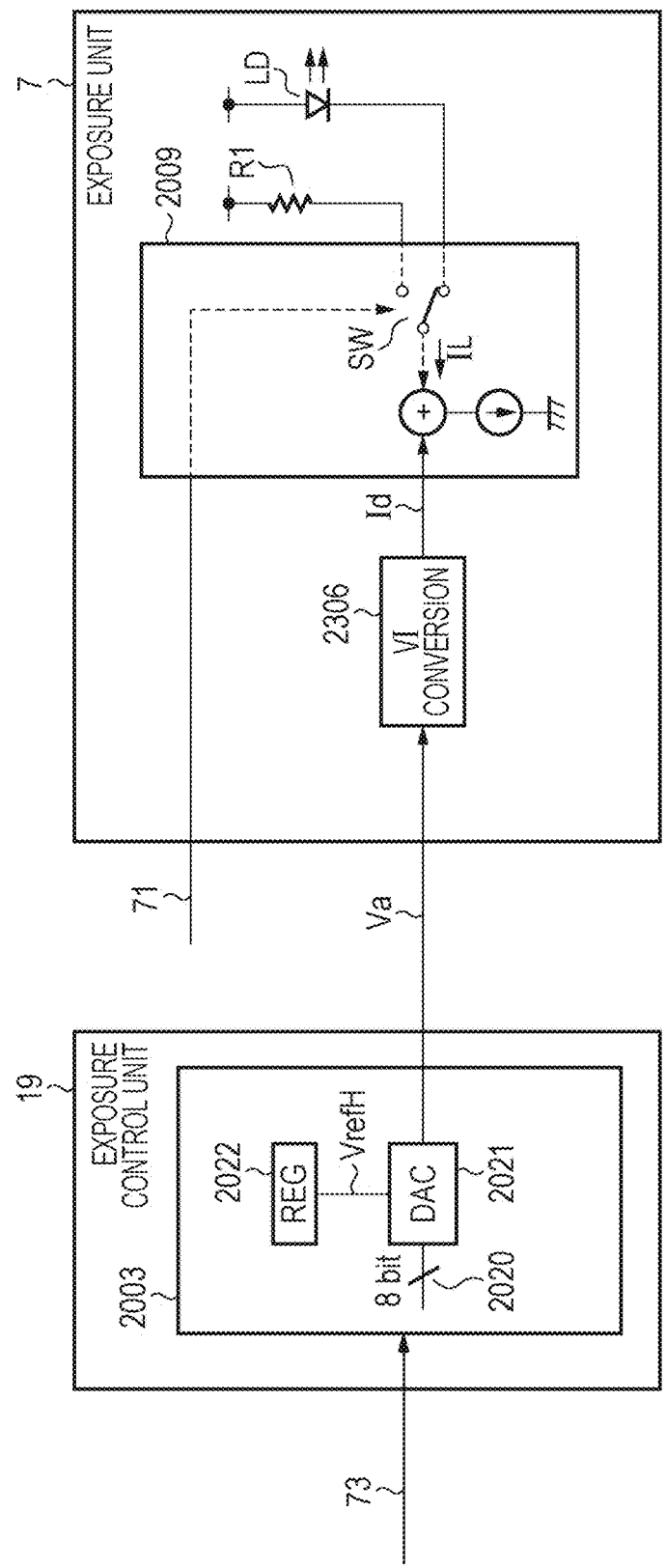
FIG. 6 illustrates a configuration of control over an exposure amount according to an embodiment.

FIG. 6 illustrates a control configuration of the exposing unit 7. The exposure control unit 19 has an IC 2003 including an 8-bit DA converter (DAC) 2021 and a regulator (REG) 2022. The IC 2003 adjusts voltage VrefH output from the regulator 2022 on basis of an intensity adjustment signal 73 set by the CPU 10. The voltage VrefH is a reference voltage for the DA converter 2021. The IC 2003 sets input data 2020 for the DA converter 2021 so that the DA converter 2021 outputs a voltage Va to the exposing unit 7. A VI conversion circuit 2306 in the exposing unit 7 converts the voltage Va to an electric current value Id and outputs it to a driver IC 2009. The driver IC 2009 controls the exposure intensity of the exposing unit 7 on basis of the electric current value Id. In other words, the exposure control unit 19 can control the exposure intensity of the exposing unit 7 on basis of the voltage Va. The driver IC 2009 further turns a switch (SW) for the driver IC 2009 in accordance with a drive signal 71 output from the image calculating unit 9. The SW is turned to select whether electric current IL is to be fed to a laser diode (LD) of the exposing unit 7 or to a dummy resistance R1 for ON/OFF control over the light emission to be performed by the LD.

Figure 7A:
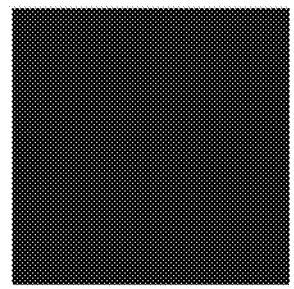
FIGS. 7A to 7D are explanatory diagrams illustrating a method for controlling an exposure amount according to an embodiment.
Figure 7B:
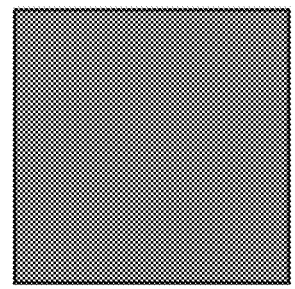
Figure 7C:
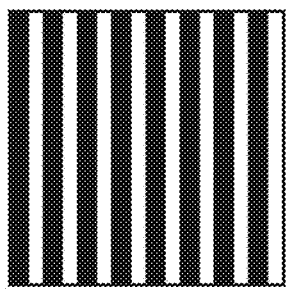
Figure 7D:
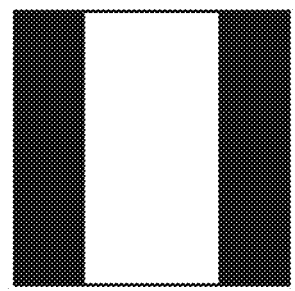

Next, a method for controlling the exposure amount of a pixel will be described. FIG. 7A illustrates a state acquired by exposing a whole region of one pixel to light with 100% intensity of a predetermined target intensity. FIGS. 7B to 7D illustrate pixels having a substantially half density of that of the pixel in FIG. 7A. The pixel in FIG. 7B has a state acquired by exposing a whole region of one pixel to light with 50% intensity of the predetermined target intensity. The exposure intensity here is controlled with voltage Va output from the exposure control unit 19 to the exposing unit 7, as described with reference to FIG. 6. FIGS. 7C and 7D illustrate states of one pixel divided into N sub pixels (where N is a natural number equal to or higher than 2) acquired by exposing the sub pixels to light with 100% intensity of the predetermined target intensity. This may be achieved by setting voltage Va such that the exposure intensity can be equal to a target intensity and turning on/off the SW in response to the drive signal 71 in the control configuration in FIG. 6. In this case, the drive signal 71 is a PWM (pulse width modulation) signal.

Figure 8:
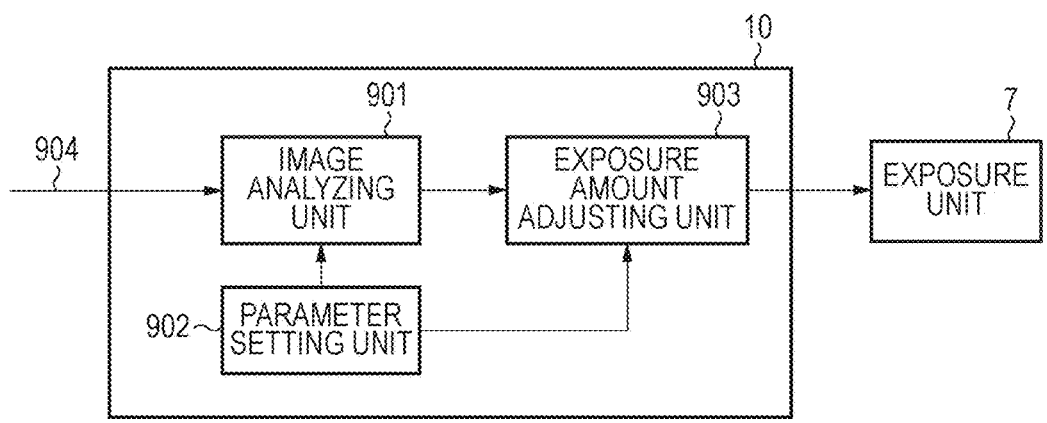
FIG. 8 is a functional block diagram illustrating a CPU for controlling an exposure amount according to an embodiment.

FIG. 8 illustrates functional blocks in the CPU 10 for suppressing an edge effect. According to this embodiment, the CPU 10 is configured to perform processing for suppressing an edge effect. However, as already described above, the processing may be performed in cooperation with the ASIC 18 or by the ASIC 18 alone. The parameter setting unit 902 notifies and sets a correction width parameter on the LUT 112 to and in the image analyzing unit 901. The parameter setting unit 902 notifies and sets an exposure-amount adjustment parameter on the LUT 112 to and in the exposure amount adjusting unit 903. The image data 904 transmitted from the host computer 8, that is, input image data, are stored in the memory 11 illustrated in FIG. 1. The image analyzing unit 901 identifies a pixel at which an edge effect may possibly occur from pixels of an image formed from the image data 904 on basis of the correction width parameter and notifies the identified pixel to the exposure amount adjusting unit 903. The exposure amount adjusting unit 903 corrects the pixel value of the pixel identified by the image analyzing unit 901 on basis of the exposure-amount adjustment parameter to generate corrected image data. The exposing unit 7 is controlled on basis of the corrected image data, that is, the output image data.

The correction width parameter is identification information by which a pixel having an edge effect can be identified and, according to this embodiment, is information describing a range of pixels at which an edge effect may possibly occur by using a distance from a pixel at an edge or, in this example, the number of pixels from the edge. In other words, the identification information is information describing a relationship between an edge pixel positioned at an edge and a pixel to be corrected. For example, when the correction width parameter is "5", it is determined that an edge effect may occur at the five pixels from an edge. According to this embodiment, a pixel to be corrected is not identified in a direction of a width having a number of pixels lower than a value of the correction width parameter. The correction width parameters and the exposure-amount adjustment parameters are acquired in advance through experiments and simulations. Methods which adjust an exposure amount of a pixel may include, as illustrated in FIGS. 7B, 7C, and 7D, a method which adjusts the exposure intensity and a method which changes the number of sub pixels to be exposed in response to a PWM signal without changing the exposure intensity. Alternatively, the exposure intensity may be changed, and the number of sub pixels to be exposed in response to a PWM signal may then be changed.

Next, processing will be described which is to be performed by the image analyzing unit 901 for suppressing an edge effect. Though an edge in a main scanning direction is only described below, the same is true for an edge in a direction orthogonal to the main scanning direction, that is, a sub scanning direction. The sub scanning direction corresponds to a rotational direction of the photosensitive member. Hereinafter, the downstream side of the rotational direction of the photosensitive member will be called a "front side", and the upstream side will be called a "rear side". The following descriptions assume that the correction width parameter is "5". FIGS. 9A and 9B exemplarily illustrate images formed from the image data 904. FIG. 9A illustrates an image having image regions 1801a to 1801c, and FIG. 9B illustrates an image having image regions 1802a to 1802c. The expression "one image region" here refers to a region having a series of pixels to which toner is adhered. FIGS. 9A and 9B assume that the widths in the sub scanning direction of the image regions 1801a to 1801c and the image regions 1802a to 1802c are equal to 10 pixels. Referring to FIG. 9A, an interval d1 in the sub scanning direction between three image regions is larger than 10 pixels equal to two times of a range of pixels at which an edge effect may occur, such as 11 pixels or larger. On the other hand, referring to FIG. 9B, an interval d2 in the sub scanning direction between three image regions is equal to or smaller than 10 pixels equal to two times of the range of pixels at which an edge effect may occur, such as five pixels.

In the image regions 1801a to 1801c, an edge in the main scanning direction (or an edge in the horizontal direction in FIGS. 9A and 9B, which will simply be called an "edge") has a sufficient margin on the rear side or the front side so that a sufficient toner amount may be supplied for an edge effect. In other words, the image regions 1801a to 1801c may have an edge effect at five or fewer pixels from the front side and rear side edges. On the other hand, because the image region 1802a has a more sufficient margin at the downstream side edge than the front side edge, an edge effect may occur at five or fewer pixels from the front side edge. On the other hand, the image region 1802a has a smaller margin at the rear side edge close to the upstream side so that a weaker edge effect may occur due to an influence of the image region 1802b. Also, the front side and rear side edges of the image region 1802b have a weaker edge effect due to influences of the image region 1802a and 1802c. Also, the front side edge of the image region 1802c has a weaker edge effect due to an influence of the image region 1802b. On the other hand, the rear side edge of the image region 1802c has a substantially equal edge effect to that of the image regions 1801a to 1801c, that is, an edge effect stronger than that of the front side of the image region 1802c.

FIG. 10A illustrates a height of toner adhered to the image regions 1801a to 1801c. The positions of pixels in FIG. 10A are numbered from "1" in order from the front side in the sub scanning direction. The height of pixels without an edge effect is normalized as "1". As illustrated in FIG. 10A, the image regions 1801a to 1801c have an edge effect substantially equal to that of five or fewer pixels from the front side and the rear side.

On the other hand, FIGS. 10B to 10D illustrate heights of toner adhered to the image regions 1802a to 1802c. FIGS. 10B to 10D are illustrated in the same manner as that in FIG. 10A. As illustrated in FIG. 10B, in the sub scanning direction, five or fewer pixels from the front side edge of the image region 1802a have an edge effect substantially equal to that of the image regions 1801a to 1801c. However, the edge effect at the rear side edge of the image region 1802a is weaker than the edge effect at the front side edge. As illustrated in FIG. 10C, the edge effect at the front side and rear side edges of the image region 1802b is weaker than the edge effect of the image regions 1801a to 1801c. Furthermore, as illustrated in FIG. 10D, the rear side edge of the image region 1802c has an edge effect substantially equal to that of the image regions 1801a to 1801c while the front side edge of the image region 1802c has a weaker edge effect.

Figures 11A, 11B, 11C, 11D, 11E:
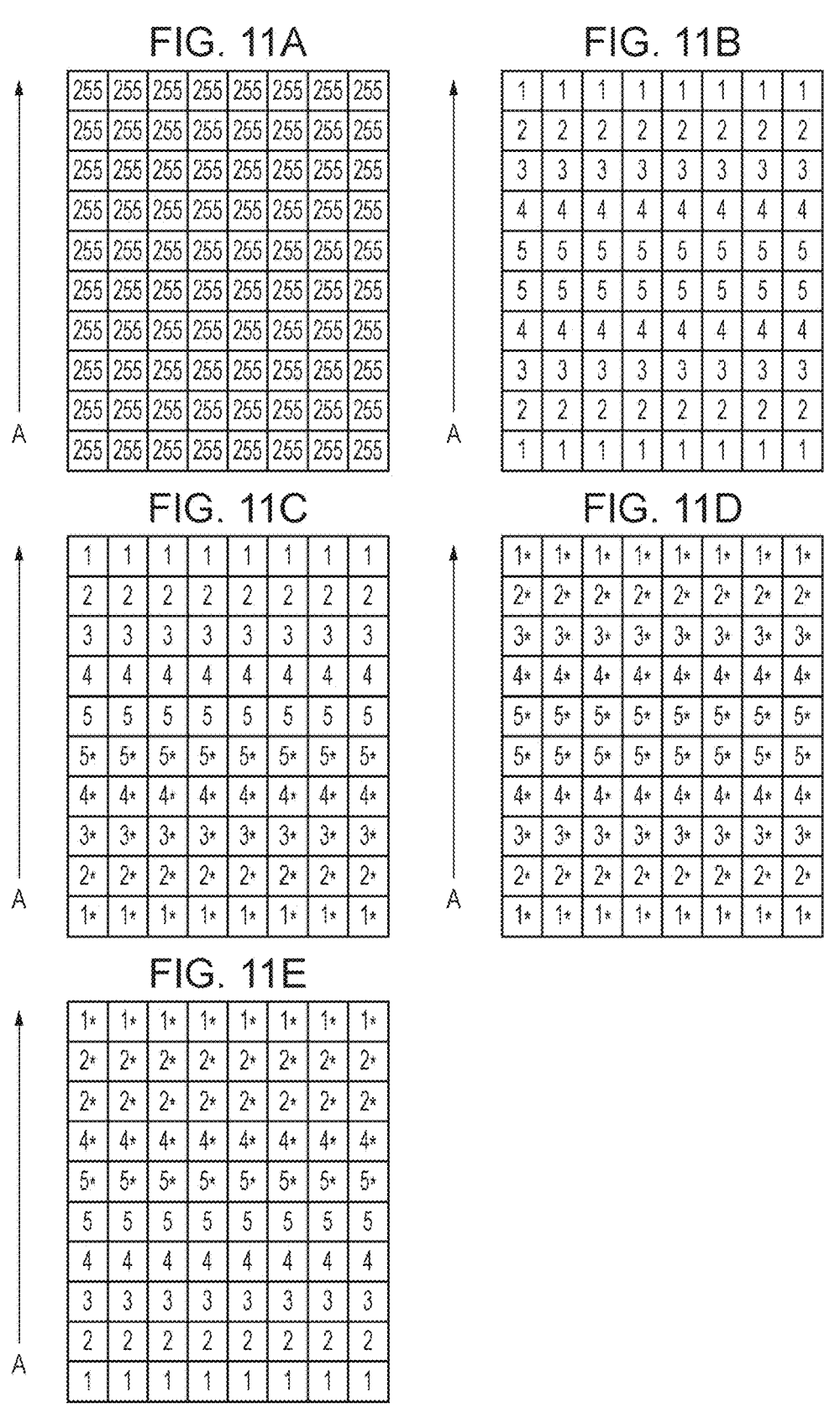

As illustrated in FIG. 11A, all pixels in the image regions 1801a to 1801c and 1802a to 1802c are assumed to have a pixel value "255". FIGS. 11A to 11E illustrate pixels in an extracted center area in the main scanning direction of the image regions 1801a to 1801c and 1802a to 1802c. A pixel value between the image regions is assumed to be "0". FIGS. 11A to 11E further illustrate arrows A each indicating the sub scanning direction. FIG. 11B illustrates pixels identified by the image analyzing unit 901 as pixels to be corrected in the image regions 1801a to 1801c. Referring to FIGS. 11A to 11E, numbers 1 through 5 indicate distances (lowest values) from an edge in the sub scanning direction. Because the correction width parameter is "5", the image analyzing unit 901 determines that an edge effect may possibly occur in ranges of five pixels from the front side and rear side edges of the image regions 1801a to 1801c. FIG. 11C illustrates pixels identified by the image analyzing unit 901 as pixels to be corrected in the image region 1802a. Because the correction width parameter is "5", the pixels to be corrected are identified in the same manner as that in the image regions 1801a to 1801c illustrated in FIG. 11B. However, five or fewer pixels from the rear side edge of the image region 1802a have a weaker edge effect than the edge effect occurring in five or fewer pixels from the front side edge as described above. Referring to FIG. 11C, a pixel having a weaker edge effect has "*" for distinction.

FIGS. 11D and 11E illustrate pixels identified by the image analyzing unit 901 as pixels to be corrected in the image region 1802b and 1802c. A pixel having a weaker edge effect than the edge effect occurring in the image region 1801a, for example, has "*", like FIG. 11C.

Figure 12A:
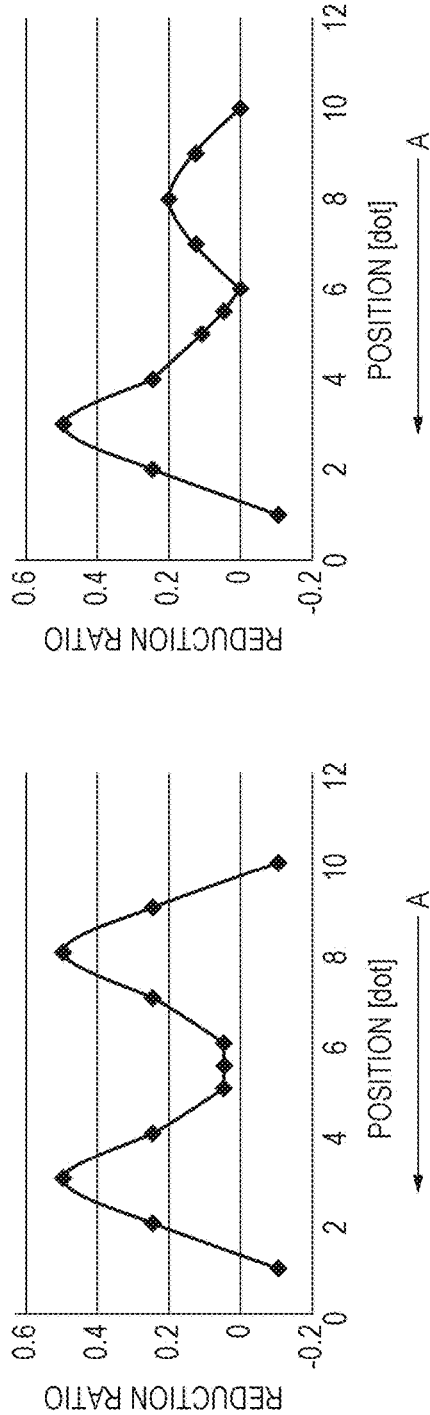
FIGS. 12A to 12D are explanatory diagrams illustrating corrections against an edge effect according to an embodiment.
Figure 12B:
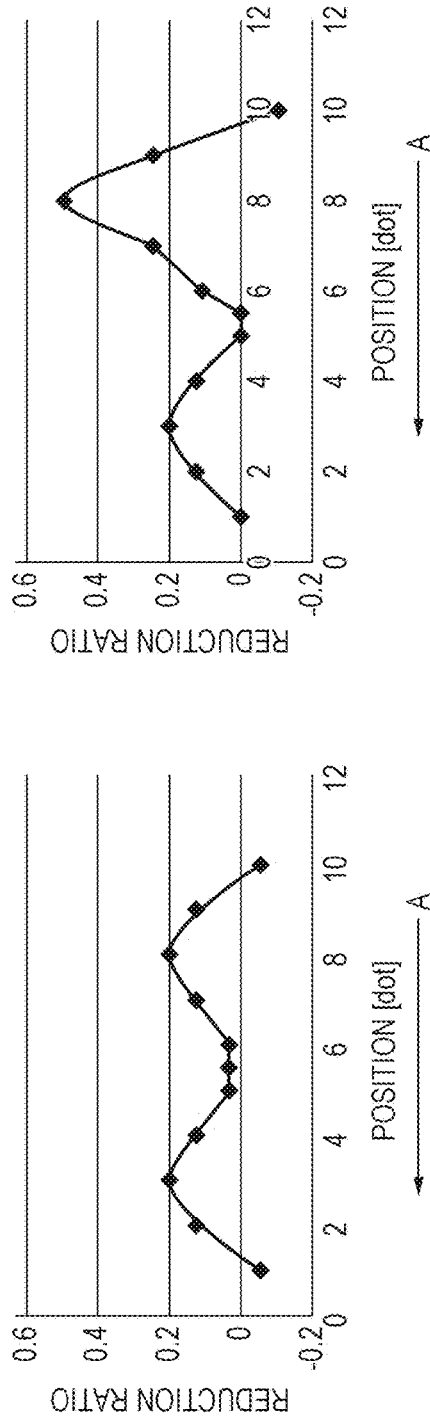
Figure 12C:
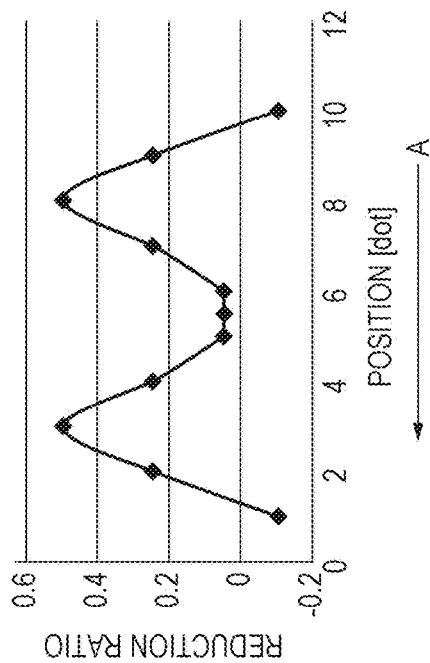
Figure 12D:
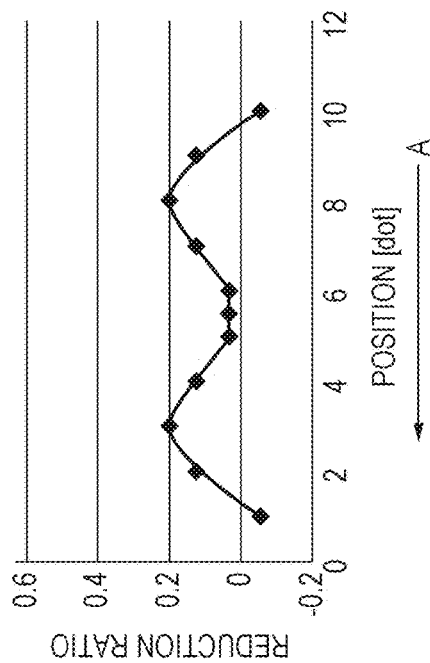

Next, correction of an exposure amount will be described. The occurrence level of an edge effect varies in accordance with the interval between image regions, as illustrated in FIGS. 10A to 10D. From that, the adjustment amount for an exposure amount is changed on basis of the interval between image regions. FIG. 12A illustrates a reduction ratio of the height of toner when the edge effect illustrated in FIG. 10A occurs. FIGS. 12B to 12D illustrate reduction ration of the heights of toner when the edge effects illustrated in FIGS. 10B to 10D occur.

FIG. 13A illustrates exposure-amount adjustment parameters corresponding to pixels without "*" in FIGS. 11A to 11E. FIG. 13B illustrates exposure-amount adjustment parameters corresponding to pixels with "*" in FIGS. 11A to 11E. In other words, the exposure-amount adjustment parameters illustrated in FIG. 13A are exposure-amount adjustment parameter applied in a case where the number of serial pixels d (hereinafter, called an interval d) to which toner is not adhered between pixels of an edge of one image region and pixels at an edge of another image region is higher than a first threshold value. In a case where no other counter image region exists to one image region with pixels at edges of the one image and a margin, that is, pixels to which toner is not adhered therebetween, an exposure-amount adjustment parameter in FIG. 13A is used irrespective of the number of pixels in the margin.

On the other hand, the exposure-amount adjustment parameters illustrated in FIG. 13B are applied in a case where the interval d is equal to or lower than the first threshold value. The first threshold value is a value two times a correction width parameter, for example. In other words, if the correction width parameter is "5", the first threshold value can be equal to 10. However, the first threshold value may be any other arbitrary value such as a value acquired through an experiment or a measurement in advance. According to this embodiment, if the interval d is equal to or lower than the first threshold value, an equal exposure-amount adjustment parameter is used irrespective of the value of the interval d. However, if the first threshold value is dt, for example, exposure-amount adjustment parameters corresponding to interval d=1 through interval d=dt. If interval d≤dt, an exposure-amount adjustment parameter corresponding to the interval d is used. An interval d equal to or lower than the first threshold value and an exposure-amount adjustment parameter may be provided in a many-to-one configuration instead of a one-to-one configuration. In other words, a plurality of exposure-amount adjustment parameters may be provided to one interval d equal to lower than the first threshold value.

Figure 14A:
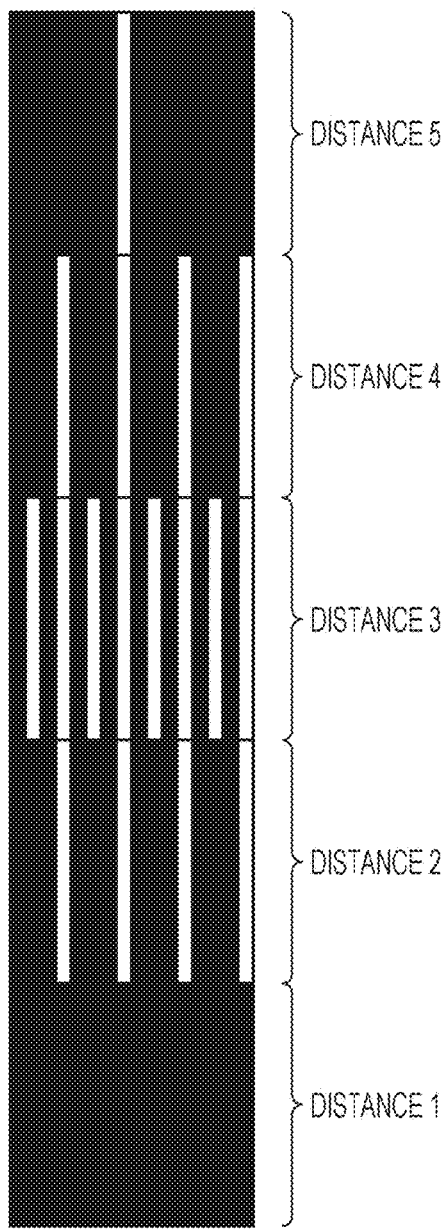
FIGS. 14A and 14B illustrate pixel exposure methods according to an embodiment.
Figure 14B:
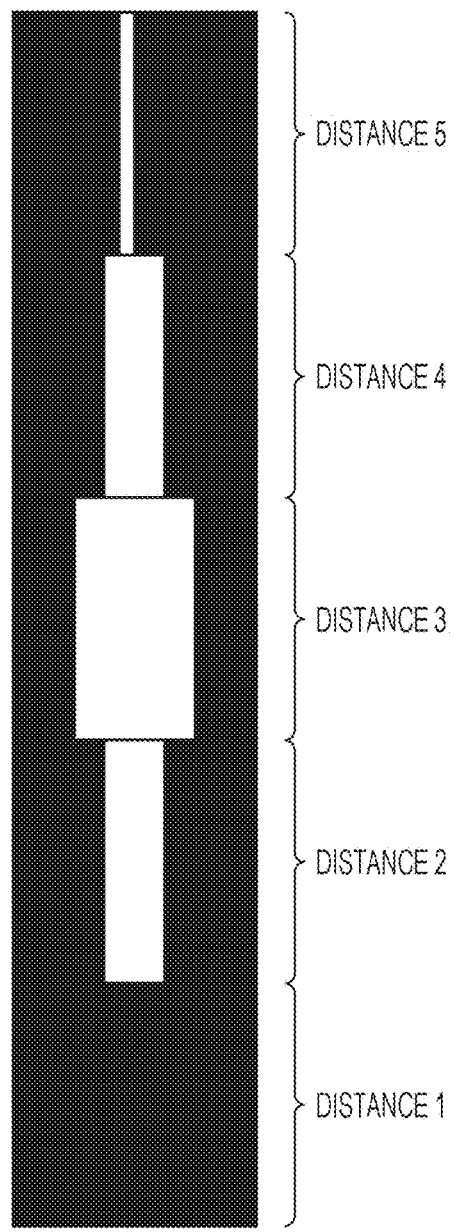

As illustrated in FIGS. 13A and 13B, the exposure-amount adjustment parameters are information describing a correction amount for adjusting the height of toner for an exposure amount, that is, a correction amount for a pixel value. The exposure intensity in FIGS. 13A and 13B supports the method for adjusting an exposure amount based on an exposure intensity as described with reference to FIG. 7B while the PWM supports the method for adjusting an exposure amount based on a PWM as described with reference to FIG. 7C. According to this embodiment, in a case where an exposure amount is adjusted on basis of a PWM, the exposure amount is not corrected for a pixel having toner having a height lower than one due to an edge effect. In other words, the correction of an exposure amount for a pixel to be corrected includes no correction as a result. FIG. 14A illustrates sub pixels to be exposed of pixels having a pixel value equal to "255" by distance from an edge in a case where the PWM is used to adjust the exposure amount in accordance with the exposure-amount adjustment parameters illustrated in FIG. 13A. While sub pixels to be exposed may be turned on and off as illustrated in FIG. 14A, an OFF time periods may be serially provided as illustrated in FIG. 14B.

The exposure amount adjusting unit 903 corrects a pixel value (exposure amount) of each pixel to be corrected in accordance with the corresponding one of the exposure-amount adjustment parameters illustrated in FIGS. 13A and 13B. Then, the image calculating unit 9 controls the exposing unit 7 on basis of the corrected pixel value.

Figure 15:
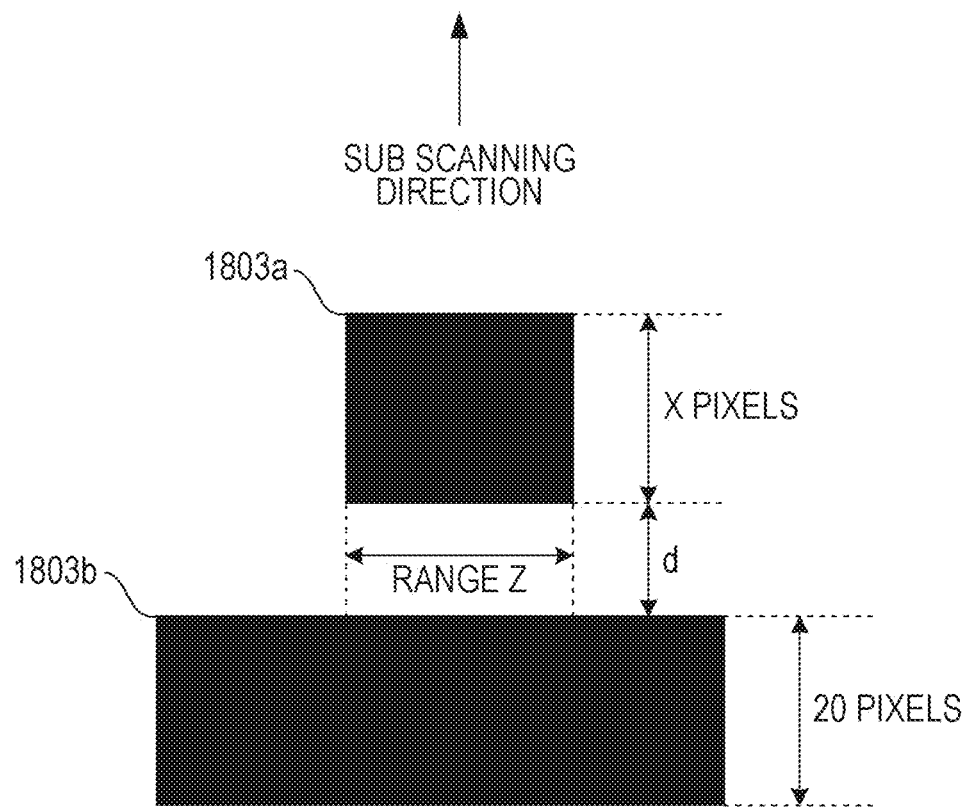
FIG. 15 illustrates images according to an embodiment.

The image regions 1801a to 1801c illustrated in FIGS. 9A and 9B have a length in the main scanning direction equal to that of the image regions 1802a to 1803c. Next, a case in which the image regions 1803a and 1803b have different lengths in the main scanning direction will be described with reference to FIG. 15. Assuming that the correction width parameter is "5" and X is 10 pixels, the strength of an edge effect on a front side edge of the image region 1803b will be described below. An edge effect occurs on the front side edge of the image region 1803b irrespective of the value of d. However, if the interval d is higher than the first threshold value or 10 pixels, the strength of the edge effect on the front side edge may be equal to that in FIG. 9A at all pixels in the main scanning direction. However, if the interval d is equal to or lower than the first threshold value, the front side edge of the image region 1803b has an weaker edge effect only at pixels in a range Z being an overlapped range in the main scanning direction of the image regions 1803a and 1803b. In other words, five pixels from an edge in the range Z in the main scanning direction have a weaker edge effect as in the case in FIG. 9B. On the other hand, five pixels from an edge excluding the range Z in the main scanning direction have an edge effect that is not weakened and is substantially equal to that in the case in FIG. 9A because other pixels to which toner is adhered do not exist within the first threshold value in the sub scanning direction from the front side edge.

According to this embodiment, the strength of the edge effect is determined on basis of the interval between edges of different image regions without consideration of the width of the image regions. In other words, referring to the case in FIG. 15, for example, the strength of the edge effect occurring at the front side edge of the image region 1803b is determined on basis of the value of d without consideration of the value of X. However, the determination of the strength of an edge effect may further be based on the value of X. This is because a lower value of X means that there is a sufficient amount of toner to be supplied to the image region 1803b. Therefore, if the value of d is equal to or lower than the first threshold value, the value of X is further used for correction of the exposure amount. In this case, a second threshold value, for example, is defined for the value of X. An exposure-amount adjustment parameter may be provided in each of cases where the value of d is higher than the first threshold value, where the value of d is equal to or lower than the first threshold value and the value of X is higher than the second threshold value, and where the value of d is equal to or lower than the first threshold value and the value of X is equal to or lower than the second threshold value. The second threshold value may be 10 pixels, for example, like the first threshold value. In a case where the value of d is equal to or lower than the first threshold value and the value of X is equal to or lower than the second threshold value, a plurality of exposure-amount adjustment parameters corresponding to each of the values of X equal to or lower than the second threshold value may be provided. The value of X equal to or lower than the second threshold value and the exposure-amount adjustment parameter may be provided in a many-to-one configuration instead of a one-to-one configuration. In other words, a plurality of exposure-amount adjustment parameters may be provided to X equal to or lower than the second threshold value. Furthermore, a plurality of exposure-amount adjustment parameters may be provided to a combination of the value of d equal to or lower than the first threshold value and the value of X equal to or lower than the second threshold value.

The same processing method as that for an edge in the main scanning direction may be applied to an edge in the sub scanning direction such that the strength of an edge effect is determined and that the exposure amount is adjusted with an exposure-amount adjustment parameter based on the strength, as described above. Next, a pixel will be described which positions within a correction width parameter from an edge in the main scanning direction and an edge in the sub scanning direction. The pixel may sometimes be determined as having a stronger edge effect by the determination in the main scanning direction and may be determined as a weaker edge effect by the determination in the sub scanning direction. In this case, it may be configured such that the stronger one may be selected. Alternatively, it may be configured such that the weaker one may be selected.

Figure 16A:
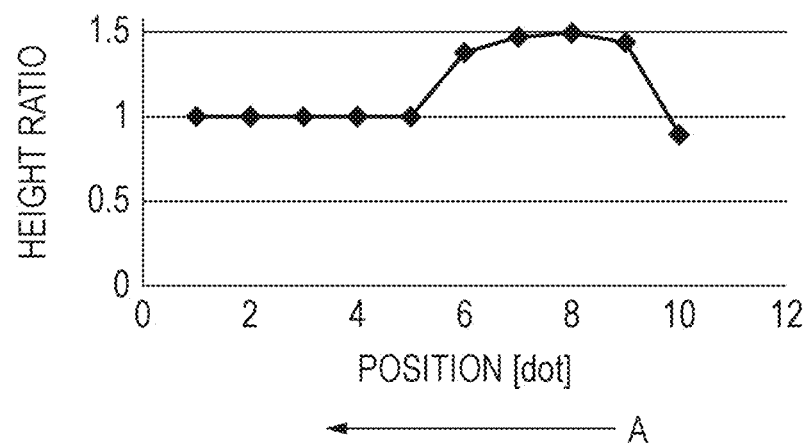
FIGS. 16A and 16B illustrate heights of toner of toner images subject to a sweep-up according to an embodiment.

Next, a method for suppressing an influence of a sweep-up will be described. The same fundamental way of thinking as that for an edge effect may be applied to a sweep-up though an edge effect and a sweep-up are different in that an edge effect occurs over a whole edge as described above while a sweep-up occurs at a rear side edge. In other words, the fundamental difference is that an edge to be processed is a rear side edge. The difference from the processing for an edge effect will be mainly described below. It is again assumed here that the correction width parameter is "5". FIG. 16A illustrates a height of toner in a case where a sweep-up occurs in the image regions 1801a to 1801c in FIG. 9A. The horizontal axis indicates a front side edge as a first position. Because an interval d1 is equal to 10 pixels that is a sufficient width in the image in FIG. 16A, the height of toner on five pixels corresponding to the correction width parameter from the rear end side edge is high.

Figure 16B:
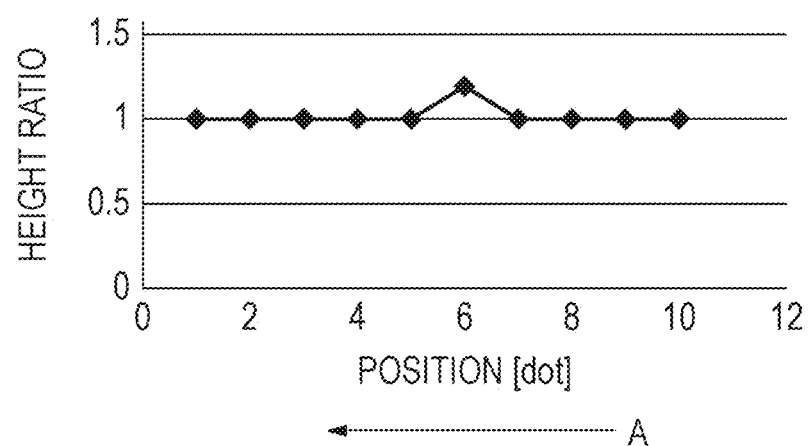

On the other hand, FIG. 16B illustrates a height of toner in a case where a sweep-up occurs in the image regions 1802a to 1802c in FIG. 9B. It is assumed here that an interval d2 is equal to one pixel. Referring to FIG. 9B, the sixth pixel, that is, the fifth pixel from the rear side edge has a larger height. This is because d2=1 in this example. In other words, a sweep-up occurs due to a peripheral speed difference between the photosensitive member 1 and the developing roller 14 as described with reference to FIGS. 5A to 5C. Thus, the pixel having a sweep-up varies in accordance with the value of the interval d. More specifically, when the correction width parameter is y and the interval is d, the height of the toner between the yth pixel and the (y−d+1)th pixel from the rear end is larger. Therefore, when the interval d is higher than the correction width parameter, a sweep-up occurs in a range to the yth pixel from an edge. The strength of such a sweep-up depends on the interval d, like the edge effect. According to this embodiment, the strength is determined on basis of whether the interval d is larger than y pixels equal to a third threshold value that is the correction width parameter here. The third threshold value may be another value acquired through an experiment or a measurement, for example. Like the processing for an edge effect, if the interval d is equal to or lower than the third threshold value, the strength of a sweep-up may be determined in a plurality of steps in accordance with the value of the interval d. Alternatively, the width in the sub scanning direction of an image region subsequent to the rear side edge may be used for the determination of the strength of a sweep-up.

Figure 17A:
FIGS. 17A and 17B illustrate pixels to be corrected against a sweep-up according to an embodiment.
Figure 17B:

FIG. 17A illustrates pixels identified by the image analyzing unit 901 as pixels to be corrected in the image regions 1801a to 1801c. Numbers 1 through 5 indicate distances (lowest values) from a rear end of an edge. Because the correction width parameter is "5", the image analyzing unit 901 determines that an edge effect may possibly occur in ranges of five pixels from rear end side edges in the sub scanning direction of the image regions 1801a to 1801c. FIG. 17B illustrates pixels identified by the image analyzing unit 901 as pixels to be corrected in the image regions 1802a to 1802c. In this example, as described above, because the correction width parameter is "5" and d2=1, a sweep-up occurs at the fifth pixel from the rear end edge, and the strength is higher than that in the image region 1801a, which is indicated by "*".

A pixel influenced by an edge effect or a sweep-up is identified on basis of a correction width parameter and is determined as a pixel to be corrected. In this case, an interval to a neighboring image region is calculated, and the exposure-amount adjustment parameter based on the distance is used. The exposure amount of the identified pixel is corrected on basis of the distance from the edge. The correction of an exposure amount includes no correction as a result. In other words, a pixel to be corrected may be identified, but the exposure amount or the pixel value of the identified pixel may not be changed in accordance with some exposure-amount adjustment parameters. For example, when the correction width parameter is "5", five pixels from an edge are typically identified as pixels to be corrected, but the exposure amount of a pixel at a certain distance therefrom may not be changed in accordance with some exposure-amount adjustment parameters. This is because the correction width parameters may be complicated when the exposure amounts of pixels to be corrected are always to be adjusted. With this configuration, the exposure amounts of pixels to which toner is excessively adhered due to an edge effect or a sweep-up can be adjusted. Furthermore, the exposure amounts are not reduced unnecessarily, which can prevent reduction of image quality of an image in a part adjacent to pixels. Prevention of excessively adhering of toner can further reduce the consumed amount of toner.

According to this embodiment, all of pixel values of the image regions 1801a to 1801c, and 1802a to 1802c are "255". However, a pixel with a pixel value equal to or higher than a predetermined value may be determined as a black pixel, and a pixel with a pixel value lower than the predetermined value may be determined as a white pixel. A region having black pixels continuously may be handled as one image region, and a region having white pixels continuously may be handled as one margin region.

Second Embodiment

According to the first embodiment, if the interval between image regions is equal to or lower than the first threshold value, the pixel values are adjusted by using an exposure-amount adjustment parameter according to the interval because a weaker edge effect or sweep-up effect occurs compared with a case with an interval higher than the first threshold value. However, according to a second embodiment, if the interval between image regions is equal to or lower than a first threshold value, it is determined that no edge effect or sweep-up occurs so that the exposure amount is not adjusted by using an exposure-amount adjustment parameter. Pixels within a correction width parameter from a plurality of edges are determined in different directions, and the corresponding exposure amount may be corrected based on the strongest edge effect, for example.

The aforementioned embodiments apply the image forming apparatus 101. However, the embodiments may be implemented by an image processing apparatus which supplies corrected image data to an image forming apparatus. The image processing apparatus has the image calculating unit 9 illustrated in FIG. 1 and generates image data corrected by adjusting the corresponding exposure amount as described above. The image processing apparatus supplies the generated image data to the image forming apparatus instead of the exposing unit 7.

CONCLUSION

The image analyzing unit 901, as described above, identifies a first region that is a region serially having pixels having a series of pixel values equal to higher than a predetermined value and a second region that is a region having a series of pixels having pixel values lower than the predetermined value on basis of image data. For example, the predetermined value may be "1", and a region having a series of pixels to which toner is adhered as described in image data may be the first region, and a region having a series of pixels to which toner is not adhered as described in image data may be a second region. The image analyzing unit 901 identifies pixels to be corrected from pixels within the first region based on a correction width parameter being identification information regarding a pixel to be corrected. The correction width parameter is information describing a relationship between an edge pixel positioned at an edge of the first region and a pixel to be corrected with respect to the edge pixel. For example, for an edge effect, the correction width parameter is information describing a distance from an edge pixel in the sub scanning direction and the main scanning direction, and a pixel within the distance is a pixel to be corrected. For example, for a sweep-up, the correction width parameter is information describing a distance in the sub scanning direction from an edge pixel on a rear end side in a rotational direction of the photosensitive member, and a pixel within the distance is a pixel to be corrected.

The exposure amount adjusting unit 903 determines whether any other first region exists which faces the edge pixel across the second region on a line in a predetermined direction passing through the edge pixel or not. If another first region exists, the exposure amount of a pixel to be corrected, which is identified based on the edge pixel and the correction width parameter, is corrected by using a first number of pixels being a number of pixels on the line in the second region between the first region and the other first region. The first number of pixels corresponds to the interval d according to the aforementioned embodiments. The exposure amount adjusting unit 903 holds first information describing a correction amount applied in a case where the first number of pixels is higher than a first threshold value and second information describing a correction amount applied in a case where the first number of pixels is equal to or lower than the first threshold value. According to the aforementioned embodiments, the first information and the second information correspond to the exposure-amount adjustment parameters. The exposure amount adjusting unit 903 corrects an exposure amount by using the first information or second information selected in accordance with the first number of pixels. The exposure-amount adjustment parameters corresponding to the second information may be provided to a plurality of values of the first number of pixels equal to or lower than the first threshold value. If the first number of pixels is equal to or lower than the first threshold value, the exposure amount of a pixel to be corrected, which is identified on basis of the edge pixel and the correction width parameter may not be corrected.

Furthermore, if another first region facing the edge pixel across the second region exists on the line in the predetermined direction passing through the edge pixel of the first region, the exposure amount adjusting unit 903 determines that second number of pixels being the number of pixels on the line in the other first region. More specifically, the number of a series of pixels in the other first region from the pixel in the other first region be in contact with the second region is determined as a second number of pixels. The second number of pixels may be used for correcting the exposure amount of the pixel to be corrected, which is identified on basis of the edge pixel and the correction width parameter. The second number of pixels corresponds to "X" in FIG. 15 according to the aforementioned embodiments. The predetermined direction is the same as the direction in which a pixel to be corrected on basis of the correction width parameter. In other words, it may be the main scanning direction or the sub scanning direction, or the main scanning direction and the sub scanning direction. However, other direction may be applicable.

Other Embodiments

The disclosure may be implemented by processing including supplying a program implementing one or more functions of the aforementioned embodiments to a system or an apparatus over a network or a through a storage medium and causing one or more processors in a computer in the system or apparatus to read and execute the program. The embodiments may further be implemented by a circuit (such as an ASIC) configured to implement one or more functions.

According to the embodiments, reduction of image quality can be suppressed, and the consumed amount of a developing agent can be reduced.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus forming an image on basis of image data, the apparatus comprising:
   a photosensitive member;
   an exposing unit configured to expose the photosensitive member to light to form an electrostatic latent image;
   a developing unit configured to develop the electrostatic latent image by using a developing agent to form an image;
   a region identifying unit configured to, on basis of the image data, identify a first region being a region having a series of pixels with a pixel value equal to or higher than a predetermined value and a second region being a region having a series of pixels with a pixel value lower than the predetermined value;
   a pixel identifying unit configured to identify a pixel to be corrected from the pixels within the first region on basis of identification information describing a relationship between an edge pixel positioned at an edge of the first region and the pixel to be corrected; and
   a correcting unit configured to correct an exposure amount applied by the exposing unit for the pixel to be corrected from an exposure amount described in the image data,
   wherein, in a case where another first region exists which faces the edge pixel across the second region on a line in a predetermined direction passing through the edge pixel of the first region, the correcting unit determines, in accordance with a first number of pixels being a number of pixels on the line within the second region between the first region and the other first region, whether to correct the exposure amount for the pixel to be corrected.

2. The image forming apparatus according to claim 1, wherein the correcting unit corrects the exposure amount for the pixel to be corrected in a case where the first number of pixels is higher than a first threshold value and does not correct the exposure amount of the pixel to be corrected in a case where the first number of pixels is equal to or lower than the first threshold value.

3. The image forming apparatus according to claim 1, wherein, in a case where another first region exists which faces the edge pixel across a second region on a line in a predetermined direction passing through the edge pixel of the first region, the correcting unit corrects the exposure amount of a pixel to be corrected identified on basis of the edge pixel and the identification information further in accordance with a second number of pixels being a number of a series of pixels in the other first region from a pixel within the other first region in contact with the second region on the line.

4. The image forming apparatus according to claim 1, wherein the predetermined direction is a main scanning direction or a sub scanning direction.

5. The image forming apparatus according to claim 4, wherein the identification information is information describing a range of pixels to be corrected in the predetermined direction from the edge pixel of the first region.

6. The image forming apparatus according to claim 1,
   wherein the predetermined direction is a sub scanning direction; and
   wherein the identification information is information describing a range of pixels to be corrected in the predetermined direction from the edge pixel of the first region on an upstream side in a rotational direction of the photosensitive member.

7. The image forming apparatus according to claim 4, wherein the pixel identifying unit does not identify a pixel to be corrected based on the edge pixel in a case where the number of a series of pixels of the first region from the edge pixel is equal to or lower than a predetermined value on the line in the predetermined direction passing through the edge pixel of the first region.

8. The image forming apparatus according to claim 6, wherein the pixel identifying unit does not identify a pixel to be corrected based on the edge pixel in a case where the number of a series of pixels of the first region from the edge pixel is equal to or lower than a predetermined value on the line in the predetermined direction passing through the edge pixel of the first region.

9. The image forming apparatus according to claim 1, wherein a pixel with a pixel value equal to or higher than the predetermined value is a pixel to which toner is to be adhered, and a pixel with a pixel value lower than the predetermined value is a pixel to which toner is not to be adhered.

10. An image processing apparatus supplying output image data for forming an image to an image forming apparatus having a photosensitive member, an exposing unit configured to expose the photosensitive member to light to form an electrostatic latent image, and a developing unit configured to develop the electrostatic latent image by using a developing agent to form an image, the image processing apparatus comprising:
- a region identifying unit configured to, on basis of input image data, identify a first region being a region having a series of pixels with a pixel value equal to or higher than a predetermined value and a second region being a region having a series of pixels with a pixel value lower than the predetermined value;
- a pixel identifying unit configured to identify a pixel to be corrected from the pixels within the first region on basis of identification information describing a relationship between an edge pixel positioned at an edge of the first region and the pixel to be corrected; and
- a correcting unit configured to correct an exposure amount applied by the exposing unit for the pixel to be corrected from an exposure amount described in the image data to generate the output image data,
wherein, in a case where another first region exists which faces the edge pixel across the second region on a line in a predetermined direction passing through the edge pixel of the first region, the correcting unit determines, in accordance with a first number of pixels being a number of pixels on the line within the second region between the first region and the other first region, whether to correct the exposure amount for the pixel to be corrected.

* * * * *